US011281437B2

(12) United States Patent
Millington

(10) Patent No.: US 11,281,437 B2
(45) Date of Patent: Mar. 22, 2022

(54) USER INTERFACE DESIGN PLATFORM, SYSTEM, AND METHOD FOR APPLYING CONSISTENT LOOK AND FEEL

(71) Applicant: Embarcadero Technologies, Inc., Austin, TX (US)

(72) Inventor: David Millington, Tallinn (EE)

(73) Assignee: Embarcadero Technologies, Inc., Austin, TX (US)

( * ) Notice: Subject to any disclaimer, the term of this patent is extended or adjusted under 35 U.S.C. 154(b) by 167 days.

(21) Appl. No.: 16/857,665

(22) Filed: Apr. 24, 2020

(65) Prior Publication Data

US 2020/0363943 A1  Nov. 19, 2020

Related U.S. Application Data

(60) Provisional application No. 62/847,450, filed on May 14, 2019.

(51) Int. Cl.
| | |
|---|---|
| *G06F 8/34* | (2018.01) |
| *G06F 3/04883* | (2022.01) |
| *G06F 3/04886* | (2022.01) |
| *G06F 3/041* | (2006.01) |
| *G06F 3/044* | (2006.01) |
| *G06F 8/38* | (2018.01) |
| *G06F 8/20* | (2018.01) |
| *G06F 3/0482* | (2013.01) |

(52) U.S. Cl.
CPC ............... *G06F 8/34* (2013.01); *G06F 3/044* (2013.01); *G06F 3/0416* (2013.01); *G06F 3/0482* (2013.01); *G06F 3/04883* (2013.01); *G06F 3/04886* (2013.01); *G06F 8/20* (2013.01); *G06F 8/38* (2013.01); *G06F 2203/04808* (2013.01)

(58) Field of Classification Search
CPC ........................................................ G06F 8/34
See application file for complete search history.

(56) References Cited

U.S. PATENT DOCUMENTS

| | | | |
|---|---|---|---|
| 2006/0085745 A1* | 4/2006 | Anderson | G06F 40/154 715/273 |
| 2008/0109785 A1* | 5/2008 | Bailey | G06F 8/34 717/109 |
| 2009/0037831 A1* | 2/2009 | Best | G06F 9/451 715/764 |

* cited by examiner

*Primary Examiner* — Roland J Casillas
(74) *Attorney, Agent, or Firm* — Foley & Lardner LLP

(57) ABSTRACT

A user interface design platform in which one or more processors identify a first object in a graphical user interface (GUI) design, where the first object may be visual or nonvisual and has a plurality of first properties that are visual or nonvisual in the GUI design. The processor(s) determine one or more modified properties of the first object, where each modified property has a value different from a corresponding default property value. The processor(s) generate a changed properties list for the first object, including the one or more modified properties, and omitting other properties of the plurality of first properties. The changed properties list is displayed on a display device associated with the platform.

23 Claims, 9 Drawing Sheets

USER INTERFACE DESIGN PLATFORM, SYSTEM, AND METHOD FOR APPLYING CONSISTENT LOOK AND FEEL

CROSS-REFERENCE TO RELATED APPLICATIONS AND CLAIM OF PRIORITY

This application claims the benefit of U.S. Provisional Application No. 62/847,450, filed May 14, 2019, the entire contents of which are fully incorporated herein by reference in its entirety.

BACKGROUND

The present disclosure relates generally to a user interface (UI) design platform. The present disclosure relates more particularly to a UI design platform, system, and method that simplifies implementing UI consistency and application of a desired look and feel.

Generally, designing or building a graphical user interface (GUI) for a computer application or computer program involves some level of customization to achieve a particular look and feel. For example, even rearranging a pre-defined button within the GUI requires some level of customization to one or more properties that define the button's location within the GUI. Often times, however, the level of customization for a particular look and feel is quite complex, including numerous modifications to various properties of various objects, such as graphics, components, and controls that make up various parts of the GUI. Thus, when presented with an example, template, or mockup exhibiting some desired UI design principles or characteristic, it may not be immediately apparent how or what was customized to achieve the desired UI design principles or characteristics.

For example, in order to identify what customizations were involved for the particular look and feel, a developer generally scrolls through a list of all the properties for each modified object in the example, template, or mockup to identify corresponding ones of the changed or modified properties for each of the modified objects. Then, to apply the changed or modified properties to another object or GUI (e.g., the GUI being built), the developer may need to make manual changes (e.g., where a native copy and paste function is unavailable) by memorizing the changed property value and manually changing a corresponding property value in the other object, or the developer may copy (e.g., using a native copy and paste functionality of the computing device) one of the changed or modified properties, select a corresponding object in the GUI to apply the copied property, identify a property of the object in the GUI that corresponds to the copied property, paste the copied property into the corresponding property of the object, and repeat, until all of the changed or modified properties are copied or otherwise incorporated over to the new object or GUI, which can be tremendously tedious and time consuming.

Accordingly, an improved UI design platform, system, or method that reduces the time to identify and/or incorporate various customizations from one object or GUI to another may be desired.

The above information disclosed in this Background section is for enhancement of understanding of the background of the invention, and therefore, it may contain information that does not constitute prior art.

DETAILED DESCRIPTION

Figure 1A:
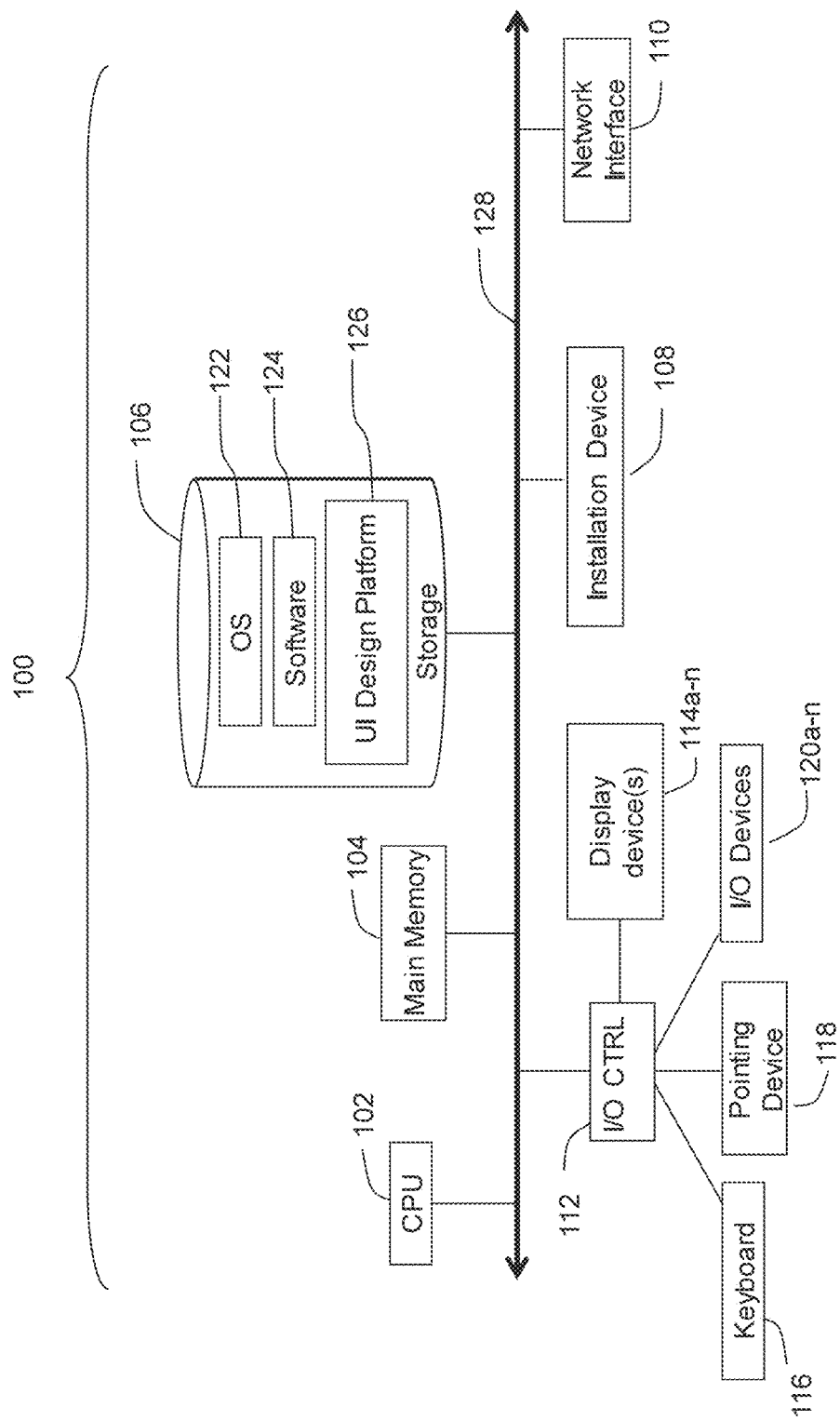
FIG. 1A is a block diagram of a computing device, according to some embodiments.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description.

Computing Device

Referring now to FIG. 1A, a block diagram of a computing device is shown, according to some embodiments. The computing device 100 may be useful for practicing one or more embodiments of the present disclosure. As shown in FIG. 1A, in some embodiments, the computing device 100 includes a central processing unit 102, a main memory unit 104, a storage device 106, an installation device 108, a network interface 110, an input/output (I/O) controller 112, one or more display devices 114 (e.g., 114a-114n), a keyboard 116, and a pointing device 118 (e.g., a mouse). The storage device 106 may include, without limitation, an operating system (OS) 122, software 124, and a software instance of a UI design platform (or tool) 126. The computing device 100 may also include additional optional elements, for example, such as a memory port, a bridge, one or more input/output devices 120 (e.g., 120a-120n), and cache memory in communication with the central processing unit 102.

In some embodiments, the central processing unit 102 may be any suitable logic circuitry that responds to and processes instructions fetched from the main memory unit 104. In some embodiments, the central processing unit 102 is provided by a microprocessor unit. For example, in some embodiments, the microprocessor unit may include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 may be based on any of these processors, or any other suitable processor capable of operating as described herein. In various embodiments, the central processing unit 102 may utilize instruction level parallelism, thread level parallelism, different levels of cache, and/or multi-core processors. A multi-core processor may include two or more processing units on a single computing component. Examples of a multi-core processors include the AMD PHENOM IIX2, INTEL CORE i5 and INTEL CORE i7.

In some embodiments, the main memory unit 104 may include one or more memory chips capable of storing data and allowing any storage location to be directly accessed by the central processing unit 102. In some embodiments, the main memory unit 104 may be volatile and faster than the storage device 106. In various embodiments, the main memory unit 104 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some embodiments, the main memory 104 or the storage device 106 may be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 may be based on any of the above described memory chips, or any other available memory chips capable of operating as described herein. In some embodiments, the central processing unit 102 communicates with the main memory unit 104 via a system bus 128 (described in more detail below). In other embodiments, the central processing unit 102 may communicate directly with the main memory unit 104 via a memory port.

In some embodiments, the central processing unit 102 may communicate directly with cache memory via a secondary bus, sometimes referred to as a backside bus. In other embodiments, the central processing unit 102 may communicate with cache memory using the system bus 128. Cache memory typically has a faster response time than the main memory unit 104, and is typically provided by SRAM, BSRAM, or EDRAM. In some embodiments, the central processing unit 102 communicates with various I/O devices 120 via a local system bus (e.g., the system bus 128). Various buses may be used to connect the central processing unit 102 to any of the I/O devices 120, including a PCI bus, a PCI-X bus, or a PCI-Express bus, or a NuBus. In embodiments in which the I/O devices 120 include a video display device 114, the central processing unit 102 may use an Advanced Graphics Port (AGP) to communicate with the display device 114 or the I/O controller 112 for the display device 114.

In various embodiments, a wide variety of I/O devices 120a-120n may be included in the computing device 100. For example, in various embodiments, the input devices of the I/O devices 120a-n may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various embodiments, the output devices of the I/O devices 120a-n may include, for example, video displays, graphical displays, speakers, headphones, inkjet printers, laser printers, and/or 3D printers.

In some embodiments, I/O devices 120a-120n may include a combination of multiple input or output devices, such as, for example, Microsoft KINECT, Nintendo Wiimote for the WIT, Nintendo WII U GAMEPAD, Apple IPHONE, Android based smart phones, and/or the like. In some embodiments, some of the I/O devices 120a-120n may allow gesture recognition inputs through a combination of some of the inputs and outputs. In some embodiments, some of the I/O devices 120a-120n may provide for facial recognition, which may be utilized as an input for different purposes including authentication and other commands. In some embodiments, some of the I/O devices 120a-120n may provide for voice recognition and inputs, such as, for example, Microsoft KINECT, SIRI for IPHONE by Apple, Google Now or Google Voice Search, and/or the like.

In some embodiments, addition I/O devices 120a-120n may have both input and output capabilities, including, for example, haptic feedback devices, touchscreen displays, multi-touch displays, and/or the like. Touchscreen, multi-touch displays, touchpads, touch mice, or other touch sensing devices may use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices may allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, may have larger surfaces, such as on a table-top or on a wall, and may also interact with other electronic devices. In some embodiments, some of the I/O devices 120a-120n, display devices 114a-114n, or group of devices may be augment reality devices. In some embodiments, the I/O devices (e.g., keyboard 116, pointing device 118, display devices 114, and/or I/O devices 120) may be controlled by the I/O controller 112 as shown in FIG. 1C. In some embodiments, an I/O device may also provide storage and/or an installation medium (e.g., installation device 108) for the computing device 100. In still other embodiments, the computing device 100 may provide USB connections to receive handheld USB storage devices. In further embodiments, an I/O device 120 may be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some embodiments, the display devices 114a-114n may be connected to the I/O controller 112. In various embodiments, the display devices 114a-114n may include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays may include, for example, stereoscopy, polarization filters, active shutters, autostereoscopy, and/or the like. Display devices 114a-114n may also include a head-mounted display (HMD). In some embodiments, display devices 114a-114n or the corresponding I/O controllers 112 may be controlled through or have hardware support for OPENGL, DIRECTX API, and/or other graphics libraries.

In some embodiments, the computing device 100 may include or connect to multiple display devices 114a-114n, which each may be of the same or different type and/or form. As such, any of the I/O devices 120a-120n and/or the I/O controller 112 may include any type and/or form of suitable hardware, software, or combination of hardware and software to support, enable or provide for the connection and use of multiple display devices 114a-114n by the computing device 100. For example, the computing device 100 may include any type and/or form of video adapter, video card, driver, and/or library to interface, communicate, connect or otherwise use the display devices 114a-114n. In one embodiment, a video adapter may include multiple connectors to interface to multiple display devices 114a-114n. In other embodiments, the computing device 100 may include multiple video adapters, with each video adapter connected to one or more of the display devices 114a-114n. In some embodiments, any portion of the operating system 122 of the computing device 100 may be configured for using multiple displays 114a-114n. In other embodiments, one or more of the display devices 114a-114n may be provided by one or more other computing devices connected to the computing device 100, via a network. In some embodiments software may be designed and constructed to use another computer's display device as a second display device 114a for the computing device 100. For example, in one embodiment, an Apple iPad may connect to a computing device 100 and use the display of the computing device 100 as an additional display screen that may be used as an extended desktop. One of ordinarily skill in the art will recognize and appreciate the various ways and embodiments that a computing device 100 may be configured to have multiple display devices 114a-114n.

In some embodiments, the storage device 106 (e.g. one or more hard disk drives or redundant arrays of independent disks) may store the operating system 122, and/or other related software, and may store application software programs such as any program related to the software instance of the UI design platform 126. Examples of the storage device 106 may include hard disk drive (HDD), optical drive including CD drive, DVD drive, and/or BLU-RAY drive, solid-state drive (SSD), USB flash drive, and/or any other suitable device for storing data. Some storage devices 106 may include multiple volatile and non-volatile memories, such as, for example, solid state hybrid drives that combine hard disks with solid state cache. Some storage devices 106 may include non-volatile, mutable, and/or read-only. Some storage devices 106 may be internal and may connect to the computing device 100 via the bus 128. Some storage devices 106 may be external and may be connect to the computing device 100 via an I/O device 120 that provides an external bus. Some storage devices 106 may connect to the computing device 100 via the network interface 110 over a network, such as, for example, the Remote Disk for MACBOOK AIR by Apple. Some computing devices 100 may not require a non-volatile storage device 106 and may be thin clients or zero clients. Some storage devices 106 may also be used as an installation device 108, and may be suitable for installing software and programs. Additionally, the operating system and the software can be run from a bootable medium, for example, such as a bootable CD (e.g. KNOPPIX), which may be a bootable CD for GNU/Linux that is available as a GNU/Linux distribution from knoppix.net.

In some embodiments, the computing device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on the computing device 100. An application distribution platform may include a repository of applications on a server or a cloud, which the computing device 100 may access over a network (e.g., the Internet). An application distribution platform may include application developed and provided by various developers. A user of the computing device 100 may select, purchase, and/or download an application via the application distribution platform.

In some embodiments, the computing device 100 may include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some embodiments, the network interface 110 may include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some embodiments, the computing device 100 may operate under the control of the operating system 122, which controls scheduling of tasks and access to system resources. In various embodiments, the computing device 100 may run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Wash.; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., among others. Some operating systems 122, including, for example, the CHROME OS by Google, may be used on zero clients or thin clients (e.g., CHROMEBOOKS).

In various embodiments, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some embodiments, the computing device 100 may have different processors, operating systems, and input devices consistent with the device.

In some embodiments, the computing device 100 may be a gaming system. For example, the computing device 100 may include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, and/or a NINTENDO WII U device manufactured by Nintendo Co., Ltd., of Kyoto, Japan, an XBOX 360, XBOX one, and/or the like manufactured by the Microsoft Corporation of Redmond, Wash., and/or the like.

In some embodiments, the computing device 100 may be a digital audio player such as the Apple IPOD, IPOD Touch, and IPOD NANO lines of devices, manufactured by Apple Computer of Cupertino, Calif. Some digital audio players may have other functionality, including, for example, a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and/or .mp4 MPEG-4 (H.264/MPEG-4 AVC) video file formats.

In some embodiments, the computing device 100 may be a tablet, for example, such as the IPAD line of devices by Apple; GALAXY TAB family of devices by Samsung; KINDLE FIRE, by Amazon.com, Inc. of Seattle, Wash.; and/or the like. In other embodiments, the computing device 100 may be an eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

UI Design Platform

Figure 1B:
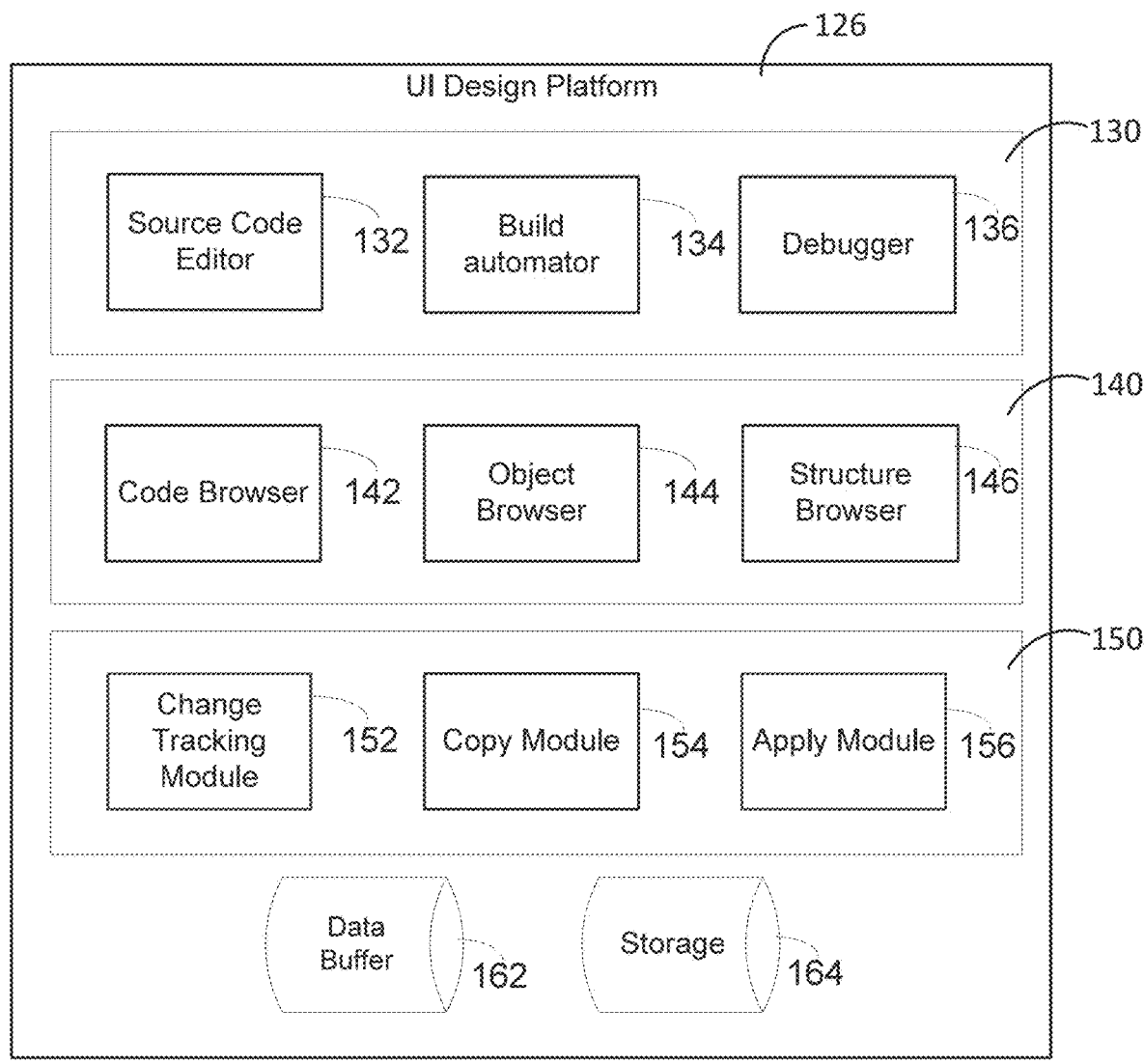
FIG. 1B is a block diagram depicting a user interface design platform, according to some embodiments.

Referring now to FIG. 1B, a block diagram depicting the UI design platform of FIG. 1A is shown in more detail, according to some embodiments. In some embodiments, the UI design platform 126 is a software program executed on the computing device 100. In other embodiments, the UI design platform 126 may be hosted on a cloud computing platform including one or more controllers, servers, and/or any other suitable computing devices that can be accessed by the computing device 100 over a network (e.g., the Internet) via the network interface 110. In some embodiments, the UI design platform 126 may include or be a part of a software development environment to facilitate software developers in building software applications for various different operating systems. For example, in some embodiments, the UI design platform 126 may be part of an integrated development environment (IDE), such as any of the RAD Studio product lines developed by Embarcadero Technologies. However, the present disclosure is not limited thereto, and in other embodiments, the UI design platform 126 may be a separate design tool (e.g., computer program) that facilitates the development of graphical user interfaces (GUIs) for various different computer programs, applications, operating systems, devices, and/or interfaces.

For example, in some embodiments, the UI design platform 126 may facilitate software developers in designing a computer application or a GUI for the computer application. In some embodiments, the UI design platform 126 may facilitate in the design of the computer application for a particular type of computing device (e.g., a particular type of operating system) or for various different computing devices (e.g., various different operating systems). For example, in some embodiments, the UI design platform 126 may include virtualization software to virtually simulate different operating systems, computing devices, and/or platforms, so that the software developer can view and design GUIs having consistent look and feel across various devices, operating systems, and platforms.

In some embodiments, the UI design platform 126 may generate a plurality of versions of the computer application so that each version is tailored to execute or run on a different type of computing device, operating system, or platform. In various embodiments, such different versions may be created automatically or under control (e.g., user input) of the software developer. Accordingly, in some embodiments, a software developer may utilize the UI design platform 126 to design an application or a GUI for the application to run on more than one type of device, operating system, or platform. For a non-limiting example, the UI design platform 126 may facilitate in the design of the computer application to execute on a desktop computer running a Windows operating system and a smart phone running an Android operating system. However, the present disclosure is not limited thereto, and other types of devices and operating systems are contemplated, for example, such as any of the devices and/or operating systems described above with reference to FIG. 1A.

In more detail, as shown in FIG. 1B, the UI design platform 126 may include a code generator 130, a developer interface 140, and a change control module 150, according to some embodiments. In some embodiments, the code generator 130 facilitates in the generation of software code and software builds for a computer application or a GUI for the computer application. For example, in some embodiments, the code generator 130 may include a source code editor 132. In some embodiments, the source code editor 132 may be a textual-based computer program configured to enable software developers to read, write, and edit the source code of a graphical user interface (GUI), a computer application, or any other suitable computer program. In some embodiments, the source code editor 132 may include features that simplify the generation of source codes, such as, for example, syntax checking, syntax highlighting, auto-complete, brace matching, and/or the like. In some embodiments, the source code editor 132 may include a structure editor that enables software developers to edit the structure of the source code using a syntax tree.

In some embodiments, the code generator 130 may further include a build automator 134, a debugger 136, and/or the like. In some embodiments, the build automator 134 facilitates the creation of a software build, including, for example, compiling code, packaging code, running automated tests, and/or the like. In some embodiments, the debugger 136 facilitates testing and debugging of the code, for example, by enabling various test functions such as querying processors, resolving symbols, interpreting expressions, single-stepping, program animation, breaking, tracking, verifying, reverse debugging, source-level debugging, symbolic debugging, low-level debugging, machine-language debugging, and/or the like. However, the present disclosure is not limited thereto, and the code generator 130 may include any number of suitable modules or functions to facilitate in the generation, build, and/or debugging of the source code associated with the computer application or GUI for the computer application.

In some embodiments, the developer interface 140 may provide an interface (e.g., GUI) to a software developer to interact with various graphics, components, and/or controls (collectively referred to as objects) to develop the computer application or GUI for the computer application. For example, in some embodiments, the developer may utilize the pointing device 118 to select and position various objects into a design area (or design surface) of a visual designer (e.g., a 2-dimensional and/or 3-dimensional designer, editor, and/or the like) for generating a GUI associated with the computer application via the developer interface 140. In some embodiments, the design area may include, for example, a window, form, card, pane, frame, 3-dimensional design area or surface, and/or the like, such that the objects arranged on the design area are shown at runtime as they would appear on a display window, mobile display screen, subsets (e.g., controls, portions of a window or screen, or the like) of a larger UI, or the like. In other examples, the developer may utilize project setting dialog or other dialog for selecting objects (such as, but not limited to, non-visual objects or objects that provide a non-visual effect in the application).

In various embodiments, the objects may include, but are not limited to, predefined visual objects, control objects (e.g., buttons, links, sliders, and/or the like), graphics (e.g., images), text, text fields, effects, buttons, animations, UI controls, combinations thereof, and/or the like. For example, in some embodiments, predefined visual objects may be graphics that are used to create standard features in a computer application, such as a menu. In other embodiments, the objects may include predefined non-visual objects or objects that have non-visual effects in the application or in the GUI for the application. In some embodiments, the objects may further include custom created objects and/or imported objects. In various embodiments, a software developer may use the original objects, custom created objects, and/or imported objects to design the GUI for the computer application.

In some embodiments, the UI design platform 126 may include one or more libraries or databases (e.g., storage 164) of various predefined, customized, and/or imported objects that may be used for creating the computer application or the GUI for the computer application. These objects may have various properties, each of the properties having a simplistic value (e.g., text or number) or a complex value (e.g., sub-values) that define its own set of properties (e.g., sub-properties, nested properties, and/or the like). Further, in some embodiments, each of the properties have a default or original property value that may be modified or changed by software developers as needed or desired. For example, in some embodiments, custom created objects and imported objects may be added to the databases (e.g., libraries or storage 164) to be retrieved for later use, and may be stored with original or default property values that define the custom created objects and imported objects.

In some embodiments, the properties of the objects may include various property types that define various characteristics of an object. For example, in some embodiments, the properties may include visual property types that define the visual characteristics of an object. Some non-limiting examples of various visual property types may include text fonts, styles, sizes, and colors. Other non-limiting examples of various visual property types may include location (e.g., top, left, width, height, etc.), size, style, texture, color, effect, shape, image, animation, and/or the like.

In some embodiments, the properties may include various behavioral property types that define controls (or functions) of the object. For example, some behavioral property types may correspond to a function or code that is called when an object (e.g., a control object) is clicked or otherwise interacted with. Other examples of some behavioral property types may correspond to an event that occurs (e.g., enabling or disabling) or configuring inbuilt functionality (e.g., default behavior) when a control is clicked or otherwise interacted with.

In some embodiments, the properties or the object (or both) may be non-visual, such as, but not limited to functional settings, behavior settings or other non-visual settings (settings that affect functions, behaviors or other non-visual aspects of the application. In certain examples such settings may include, but are not limited to: setting for one or more project work documents or other work containers, settings passed to tools when building/compiling, parallelizing work, or other settings. In some examples, properties can be non-visual in the application, or visual only in that the properties are set and viewed in a dialog (such as project settings dialog), while the effect of the property setting may be in the program function, behavior or capabilities and may be non-visual, as compared to a visual UI effect. The non-visual property or object settings may have default values. Accordingly, in such embodiments, the UI design platform 126 may provide an interface (such as, but not limited to one or more dialog pages that can be displayed) to allow the software developer to interact with and identify changed properties of objects in the application that are not visual or that do not have a visual effect in the application.

In some examples, the property settings may be nested or within other complex architecture of the application. In some examples, the settings may be in a debugging configuration and may have a default value inherited from an ancestor to the debug. In certain examples, the settings may be Boolean true/false settings, textual settings, or other suitable forms of settings that can be shown on one or more project setting dialog pages.

In some embodiments, the properties may include various relational property types that define relationships between objects, components, and controls within the application or the GUI. For example, some relational property types may correspond to communication configurations between objects (e.g., reading/writing data from one object to another), positional relationship of one object relative to another object, parent-child relationship of objects, or the like.

In more detail, in some embodiments, the developer interface 140 may include a code browser 142, an object browser 144, and a structure browser 146. In some embodiments, the code browser 142 enables software developers to browse, navigate, and visualize the source code for the GUI or the computer application. For example, the code browser 142 presents the source code in a window or section of the developer interface 140 to enable software developers to browse, navigate, and modify the source code. In some embodiments, the object browser 144 enables software developers to visualize the hierarchy of the objects (e.g., graphics, components, and/or controls) for the computer application or GUI for the computer application, including properties and events as well as other pertinent information associated with the objects. In some embodiments, the object browser also provides an interface in a window or section of the developer interface 140 to enable interaction with the objects and/or their properties. In some embodiments, the structure browser 146 enables software developers to visualize the structure of the source code by showing the code's classes, attributes, operations, and relationships among objects in a class diagram (e.g., a tree diagram) that describes the parent-child relationship of the objects and controls with respect to other objects and controls.

Still referring to FIG. 1B, in some embodiments, the change control module 150 tracks or monitors changes made to any of the original or default properties (and sub-properties, nested properties, or the like) of various objects (e.g., graphics, components, and/or controls) of the computer application or the GUI for the computer application. In some embodiments, the change control module 150 displays a list of only the changed or modified properties (including their sub-properties or nested properties, if applicable) so that the developer can quickly identify the changed or modified properties. In some embodiments, the change control module 150 enables the developer to copy the changed or modified properties and to apply the copied properties to one or more other objects of the computer application or the GUI for the computer application. For example, in some embodiments, the change control module 150 may include a change tracking module 152, a copy module 154, and an apply module 156.

In some embodiments, the change tracking module 152 may detect modifications or changes that are made to the original or default property values of various objects of the computer program or the GUI for the computer program, and may display the changed properties at a suitable location within the developer interface 140 (or at any suitable location within the display devices 114a-n). For example, in some embodiments, when a developer adds an object to a design area of a visual designer (e.g., a window, form, card, pane, frame, 3-dimensional design area, and/or the like) from a components library (e.g., libraries stored in the storage 164) or imports the object into the design area, the change tracking module 152 may generate a changed properties list for the object, and may identify the original or default property values associated with the object (e.g., as imported or stored in the libraries of storage 164). Then, as the developer interacts with the object, for example, which causes modifications or changes to one or more property values associated with the object, the change tracking module 152 may update the changed properties list for the object to track the modified or changed properties and their values for the object.

For example, in some embodiments, the change tracking module 152 may compare the property values for each property of the changed object with the original or default property values to identify the changed properties, and may store the changed properties and their changed values in the changed properties list associated with that object. In some embodiments, if the property includes sub-properties or other nested or complex values, the change tracking module 152 may compare the values of each sub-property (or nested property) with its original or default value to identify whether changes or modifications were made to the property, and may store the changed property along with its changed sub-properties (or nested properties) and their changed values in the changed properties list associated with that object. Thus, the relationship between the changed sub-properties (or nested properties) and their corresponding main property may be maintained, such that the changed sub-properties may be distinguished from similar or the same sub-properties of other main properties.

In some embodiments, the change tracking module 152 may compare the property values of the changed object with the original or default property values in real-time or near real-time (e.g., as the developer changes the property values) to identify the changed property values, and may update the change properties list in real-time or near real-time as the property values are changed. In other embodiments, the change tracking module 152 may compare or identify the changed properties, and/or may update the changed properties list with the changed properties in response to a user command or in response to an event (e.g., the selection of the object). However, the present disclosure is not limited thereto, and in other embodiments, the change tracking module 152 may not store the changed properties list, and instead, may compare all property values with their original or default property values for one or more objects to generate one or more changed properties lists as needed or desired (e.g., on demand or in response to user command).

In some embodiments, the change tracking module 152 may display the changed properties list at a suitable location within the developer interface 140 (or at any suitable location within the display devices 114a-n). In a non-limiting example, the changed properties list may be displayed in the structure browser 146, but the present disclosure is not limited thereto. In some embodiments, the change tracking module 152 may display the changed properties list for a particular object when the object is selected (e.g., via the pointing device 118 or other suitable devices). In other embodiments, the change tracking module 152 may continuously display one or more changed property lists for one or more objects at a suitable location, regardless of whether the one or more objects are selected. In some embodiments, the changed properties list may include only those properties from among the properties associated with the object that have been modified or changed. Thus, the properties associated with the object that still have their original or default property values, and thus, have not been modified or changed, may not be included in the changed properties list. Accordingly, a developer may quickly identify all the changed properties for one or more objects from the changed properties list, instead of, for example, having to manually scroll through a list of all the properties of the one or more objects (e.g., via the object browser 144) to identify the changed properties. In some embodiments, the change tracking module 152 may filter out (or omit) commonly required properties such that only useful changed properties are displayed or copied. For example, where each object is required to have a unique name property, the change tracking module 152 may ignore changes made to or differences in the name property of the object.

In some embodiments, the changed properties list displayed by the change tracking module 152 may facilitate in the copying of only the modified or changed properties (and its changed sub-properties or nested properties, if applicable) of the corresponding object. For example, in some embodiments, the developer can select one or more properties to copy from the changed properties list, and the copy module 154 may temporarily store the selected properties in a data buffer 162 (or other suitable storage) for later retrieval. In other embodiments, the developer can select one or more properties to copy from a listing (e.g., in the object browser 144) of all the properties associated with the corresponding object, and the copy module 154 may identify and copy only those selected properties that have a modified or changed value. For example, in some embodiments, the copy module 154 may compare each of the selected properties with its default or original value, and may temporarily store only those selected properties having a modified or changed value in the data buffer 162 (or other suitable storage) for later retrieval. Thus, the properties having its original or default values may not be copied, such that the copy module 154 copies only those properties having modified or changed values. In some embodiments, the copy module 154 may omit commonly required properties, for example, such as a unique name property.

In some embodiments, the copy module 154 supports a single copy transaction at a time so that each copy transaction overrides a previously stored copy transaction. In other embodiments, the copy module 154 may support multiple copy transactions so that at least two or more copy transactions are preserved and available for later retrieval. In some embodiments, the copy module 154 may store various different formats of the copied properties corresponding to various different data formats. In some embodiments, the copy module 154 may utilize native clipboard functionality associated with the OS 122 of the computing device 100 to allow other computer applications or computer programs installed on the computing device 100 to access the copied properties. In other embodiments, the copy module 154 may utilize a data buffer or storage device that is dedicated to the UI design platform 126 so that copied properties are not available to other computer applications or computer programs.

Still referring to FIG. 1B, in some embodiments, the apply module 156 may apply the copied properties from one object to one or more other objects. For example, in some embodiments, once the changed properties are copied (e.g., stored in the data buffer 162) by the copy module 154, the developer may select one or more other objects to apply the changed properties to the selected one or more other objects. In some embodiments, the apply module 156 may retrieve the copied properties (e.g., from the data buffer 162), and may apply the changed properties to the one or more other objects selected by the developer. For example, in various embodiments, the apply module 156 may access the data buffer 162 to retrieve the changed properties copied thereto by the copy module 154, or may retrieve (or receive) the changed properties from the copy module 154 upon storage or upon request. In some embodiments, the apply module 156 may compare each of the properties of the one or more selected objects with the copied properties (and their sub-properties or nested properties, if applicable) to identify corresponding properties of each of the one or more objects to apply the modification or changes. For example, in some embodiments, the apply module 156 may compare a property type (or property identifier) of each of the properties of the one or more objects with a property type (or property identifier) of each of the copied properties, such that corresponding properties are identified and the changes are applied thereto.

In some embodiments, the apply module 156 applies the modified or changed values of the copied properties to only corresponding same or similar properties of each of the one or more objects (e.g., based on the property type or identifier), and the other properties of the one or more objects are left unchanged. In some embodiments, for objects that do not have a particular property type (or property identifier) that corresponds to a property type (or property identifier) of a particular copied property, the particular copied property may be ignored, and only those properties of the selected object that correspond to other ones of the copied properties may be modified or changed. For example, if a copied property type corresponds to a shape property, and the selected object to which the copied properties are applied do not include a shape property, then the shape property of the copied properties may be ignored, while other ones of the copied properties are applied to corresponding properties of the selected object. Accordingly, in some embodiments, changed properties of one type of object may be applied to the properties of a different type of object, such that applicable properties are applied while inapplicable properties are ignored.

Similarly, in some embodiments, the apply module 156 applies modified or changed values of copied sub-properties (or nested properties) to only corresponding same or similar properties of each of the one or more objects (e.g., based on the property type or identifier) having the same or similar sub-properties (or nested properties). For example, in some embodiments, for objects that do not have a particular property type (or property identifier) that corresponds to a property type (or property identifier) of a particular copied main property, the particular copied main property (and thus, its corresponding copied sub-properties) may be ignored. On the other hand, for objects that have a property that corresponds to the copied main property, then the apply module 156 may compare each of the copied sub-properties (or nested properties) based on the type (or identifier) of the sub-properties with the sub-properties (or nested properties) of the objects. In this case, in some embodiments, if the objects do not have a sub-property that corresponds to a property type (or identifier) of a copied sub-property, then the copied sub-property may be ignored, while other ones of the copied sub-properties are applied to corresponding sub-properties of the selected object(s). In other embodiments, if the objects do not have a sub-property that corresponds to a property type (or identifier) of a copied sub-property, then all the copied sub-properties for a corresponding copied main property may be ignored, such that none of the sub-properties of a corresponding main property of the selected object (s) are modified or changed.

In some embodiments, the apply module 156 may maintain relationships between objects when applying copied properties to one or more selected objects. For example, if a copied property of a first object includes a relational property or behavioral property having a value that indicates some relationship to a second object (e.g., via a name or other unique identifier of the second object), then when the apply module 156 applies the copied property to a similar first object in the GUI (e.g., the GUI being built), the value of the copied property may not make sense since the GUI may not have another object with the same name or unique identifier as the second object. In this case, in some embodiments, the apply module 156 may maintain the relationship by identifying an object in the GUI that is similar to the second object (e.g., based on name, type, relative location, or the like), and may apply the copied property to the similar first object in the GUI by modifying the value of the copied property to reference the name or unique identifier of the similar second object in the GUI. In other embodiments, the apply module 156 may apply the same value (e.g., the name or unique identifier of the second object) as copied from the first object to the similar first object in the GUI, and may modify the name or unique identifier of the similar second object in the GUI to correspond to the name or unique identifier of the referenced second object.

In some embodiments, the apply module 156 may preserve relative positional relationships between the first and second objects when applying the copied properties to one or more selected objects. For example, if a copied property of a first object references a second object, and the locations of the first and second objects are interdependent or interrelated, then the apply module 156 may maintain the relative positional relationships between the similar first and second objects in the GUI when applying the copied properties. In this case, for example, the apply module 156 may identify properties for each of the first and second objects corresponding to its location or position within the GUI to determine the relative position between the first and second objects, and may preserve the relative position when the properties are copied to the one or more selected objects.

In some embodiments, the apply module 156 may use (or include) heuristics (e.g., machine learning, data mining, and/or the like) to maintain (or preserve) the connections (e.g., relationships, relative positions, and/or the like) between objects when applying copied properties to one or more selected objects. For example, returning to the above examples, in some embodiments, the heuristics may be used to identify the similar first and second objects in the GUI, to determine whether locations of the objects are interdependent or interrelated, to identify the relative positions between the first and second objects, and to preserve the relative positions when applying the copied properties to the similar first and second objects.

For a non-limiting example, suppose a text label object is always located above a text entry field object, and includes a relational property that defines a connection to the text entry field object (e.g., via a name, an identifier, or the like of the text entry field object). For example, the text label object may have a connection property having a value that corresponds to the name of the text entry field object (e.g., connection: MyTextEntry, where MyTextEntry is the name of the text entry field object), and a positional property that indicates its position within the UI (e.g., Top: 500). The text entry field object (e.g., having the name MyTextEntry) also has a positional property that indicates its position within the UI (e.g., Top: 520). In this case, if the copied properties of the text label object are applied to a similar text label object in the GUI being built, the heuristic may be used to identify a similar text entry field object in the GUI to preserve the relationships between the similar text label object and the similar text entry field object.

For example, assume that the GUI being built has a text entry field object with the name "MyNewTextEntry" and the position Top:320 within the GUI. When the copied properties are applied to the similar text label object, the GUI does not have a text entry field object having the name "MyTextEntry" nor a text entry field object located at position Top:520. In this case, the heuristic may identify the text entry field object with the name "MyNewTextEntry" and the position Top:320 within the GUI as a similar corresponding text entry field object as the one referenced in the copied relational property. Thus, when the apply module 156 applies the copied properties to the similar text label object in the GUI, the apply module 156 may modify the value of the copied relational property such that the similar text label field object references "MyNewTextEntry" instead of referencing "MyTextEntry" from the copied relational property. Similarly, the apply module 156 may modify the location property of the similar text label object based on the location of the identified text entry field object to preserve the relative positions of the objects. For example, the apply module 156 may modify the location property of the similar text label object to 300 (e.g., Top: 300), based on the location of the identified similar text entry field object (e.g., Top: 320) and the relative positions of the original text label object (e.g., Top: 500) and the original text entry field object (e.g., Top: 520). In various embodiments, the heuristic can identify the similar text entry field object based on any suitable computer algorithms, for example, based on the same name (e.g., MyTextEntry to MyTextEntry), based on similar names (e.g., MyTextEntry to MyNewTextEntry), based on the name of the connected object (e.g., MyTextEntryLabel name for the text label object and there is a text entry field object called MyTextEntry), based on types of objects (e.g., link to any text entry field object in the GUI being built), or the like.

Figure 2:
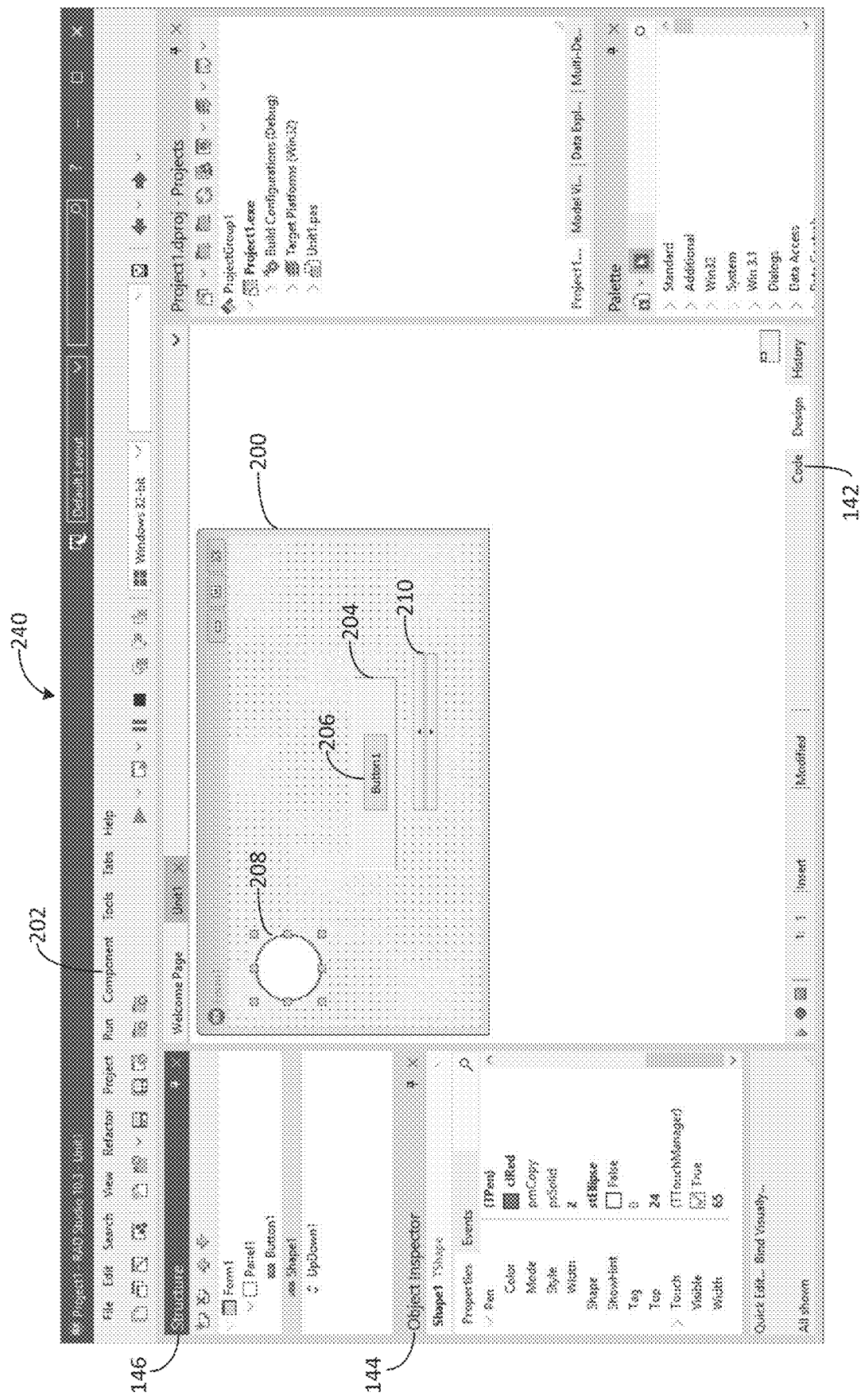
FIG. 2 is a diagram of a developer interface, according to an embodiment.

Referring now to FIG. 2, a developer interface 240 is shown according to an embodiment. In the non-limiting example of FIG. 2, a simplified use case for designing a GUI via a design area (or design surface) 200 of a visual designer is shown. Hereinafter, a non-limiting example of the design area 200 is described and shown in the various figures as a form or form window 200 for convenience. However, the present disclosure is not limited thereto, and it should be appreciated that the visual designer may include any suitable design area (or design surface) 200, for example, such as a window, card, pane, frame, 3-dimensional design area or surface, and/or the like. As shown in FIG. 2, the developer interface 240 may include a code browser 142, an object browser 144, and a structure browser 146 to enable a developer to design and generate a GUI for a computer application. In some embodiments, the developer interface 240 may further include a component library 202 that enables the developer to select and arrange various predefined, customized, or imported graphics, components, and/or controls into the form window 200 to generate the GUI for the computer application. For example, in some embodiments, various objects may be employed from the component library 202 to control features and properties of the computer application or the GUI for the computer application, and may be selected for use in the computer application. In some embodiments, the component library 202 may display a variety of predefined, customized, or imported objects, and/or may display menu options or drop down menus including categories and/or subcategories of various objects. Such menu options may link to a display or list of available graphics, components, and/or controls that may be selected and placed within the form window 200 to generate various objects of the GUI. For example, in some embodiments, various predefined, customized, or imported objects may be selected from the component library 202 and arranged in the form window 200 to design the GUI for the computer application. In various embodiments, each of the objects in the component library 202 has original or default property values that define the objects.

In a non-limiting example, as shown in FIG. 2, a developer may select object 204 from the component library 202, which is a graphical panel 204 for arranging another object 206 therein. Object 206 may be selected from the component library 202, which is a button control 206 to be used in the GUI for the computer application. The developer may also select object 210 from the component library 202, which is an up/down scroll control 210 to be used in the GUI for the computer application. Further, the developer may select object 208 from the component library 202, which is a graphical shape 208 to be used in the GUI for the computer application. However, the present disclosure is not limited thereto, and in some embodiments, any of the objects 204, 206, 208, and 210 may be imported directly into the form window 200 with its original or default property values, instead of being selected and arranged from the component library 202. In this case, the original or default property values of the imported object may correspond to the object's property values at the time of import. In other embodiments, the imported object may define its original or default property values at the time of import, which may be different from the property values of the imported object at the time of import.

For example, in some embodiments, the developer may click on and select objects (e.g., 204, 206, 208, and 210) from the component library 202, and drag the selected objects (e.g., 204, 206, 208, and 210) to a desired location within the form window 200 representing the GUI of the computer application. In some embodiments, the developer may visually position or arrange the objects (e.g., 204, 206, 208, and 210) within the form window 200 without requiting the developer to write code for the objects (e.g., 204, 206, 208, and 210) or the arrangement of the objects (e.g., 204, 206, 208, and 210) at the desired position. In this case, the UI design platform 126 may automatically generate and compile code (which may be displayed via the code browser 142) with the objects (e.g., 204, 206, 208, and 210) arranged at the desired position. In some embodiments, the clicking and positioning may be performed, for example, using the pointing device 118, but other methods of selecting and arranging the objects are contemplated. For example, in other embodiments, the clicking and positioning may be performed, for example, using a touch screen device and/or the like, and the desired objects may be selected (e.g., from the component library 202 or imported into the form window) and arranged within window 200 via a finger or touch device (e.g., a pen).

Still referring to FIG. 2, in some embodiments, the structure browser 146 of the developer interface 240 textually presents each of the objects (e.g., 204, 206, 208, and 210) arranged within the form window 200 in a parent-child relationship with respect to other components in a tree or other structural model. For example, as shown in FIG. 2, the structure browser 146 shows that the form window 200 (e.g., Form1) has a parent relationship with respect to each of the objects (e.g., 204, 206, 208, and 210) arranged within the form window 200. In addition, the structure browser 146 shows that the graphical panel 204, the up/down scroll control 210, and the graphical shape 208 are each at the same level within the hierarchy, of the form 200, and that the button control 206 has a child relationship with respect to the graphical panel 204 within the hierarchy. Accordingly, in some embodiments, the structure browser 146 enables developers to quickly view the structural relationships of the objects (e.g., 204, 206, 208, and 210) within the GUI design (e.g., the foist window 200).

In some embodiments, the object browser 144 enables developers to visualize various properties (and their sub-properties or nested properties, if applicable) of selected objects (e.g., 204, 206, 208, and 210) within the form window 200. For example, as shown in FIG. 2, when the graphical shape object 208 is selected, the object browser 144 displays the properties and values associated with the selected object 208. In some embodiments, the object browser 144 may highlight (e.g., shown in Bold letters) one or more properties (or sub-properties, nested properties, and/or the like) that have been changed or modified from the original or default properties of the selected object 208. For example, as shown in FIG. 2, the property values for the property types (or identifiers) Pen, Shape, Top, and Width for the graphical shape object 208 is shown in Bold to indicate that those properties have been modified from its original or default properties. Further, as shown in FIG. 2, the property type Pen is shown as including the sub-properties Color, Mode, Style, and Width, with the property values (or sub-property values) for Color and Width shown in Bold to indicate that those sub-properties have been modified.

While highlighting the changed properties in the object browser 144 can be useful for identifying the modified or changed properties when interacting with a particularly selected object, identifying all of the changed properties for all of the objects in the GUI can be an extremely time consuming and tedious process, especially as complexities of the GUI design increases. Further, in order to apply the changed properties from one object to another, the developer is generally required to manually identify and apply each of the changed properties one at a time to the other object. For example, to apply changes from a first object to a second object, a developer is generally required to first select the first object, identify one or more modified properties to copy from the first object, select one of the modified properties to copy, copy the modified property (or memorize the value of the modified property), select the second object, select the property of the second object to which the modified property should be applied, paste the modified property (or manually change the value of the selected property based on the value of the modified property), and repeat the above steps for each modified property that should be copied over from the first object to the second object. On the other hand, according to various embodiments, the UI design platform 126 may simplify the process of identifying, copying, and/or applying modified properties from one or more objects to another, as will be discussed in further detail with reference to FIGS. 3-6.

Referring now to FIGS. 3-6, a partial screen view of a developer interface 140 is shown according to various embodiments. In the non-limiting examples of FIGS. 3-6, a simplified use case for designing a GUI via a form window 200 is shown. In some embodiments, the developer interface 140 may be similar to the developer interface 240 as described with reference to FIG. 2. For example, in some embodiments, the developer interface 140 includes a form window 200, an object browser 144, a structure browser 146, a plurality of objects 204, 206, 208, and 210 arranged within the form window 200, and a component library 202 having a plurality of predefined, customized, or imported objects (e.g., graphics, components, and/or controls). In some embodiments, each of the plurality of objects 204, 206, 208, and 210 may be selected from the component library 202 and/or imported directly into the form window 200, and arranged within the form window 200 to generate the GUI for the computer application. Further, in some embodiments, the developer interface 140 may display a changed properties list 300 for one or more objects (e.g., the graphical shape 208) at a suitable location within the developer interface 140. For example, in some embodiments, the change tracking module 152 may display the changed properties list 300 within the structure browser 146, but the present disclosure is not limited thereto. In some embodiments, the changed properties list 300 includes only the changed properties (and their changed sub-properties, nested properties, or the like) from among all of the properties of the object (e.g., the graphical shape 208), so that the developer can quickly identify all of the changed properties for the object(s) from the changed properties list 300 without having to manually scroll through a list of all of the properties (e.g., as shown in the object inspector 144) to identify the changed properties for the object(s).

Figure 3:
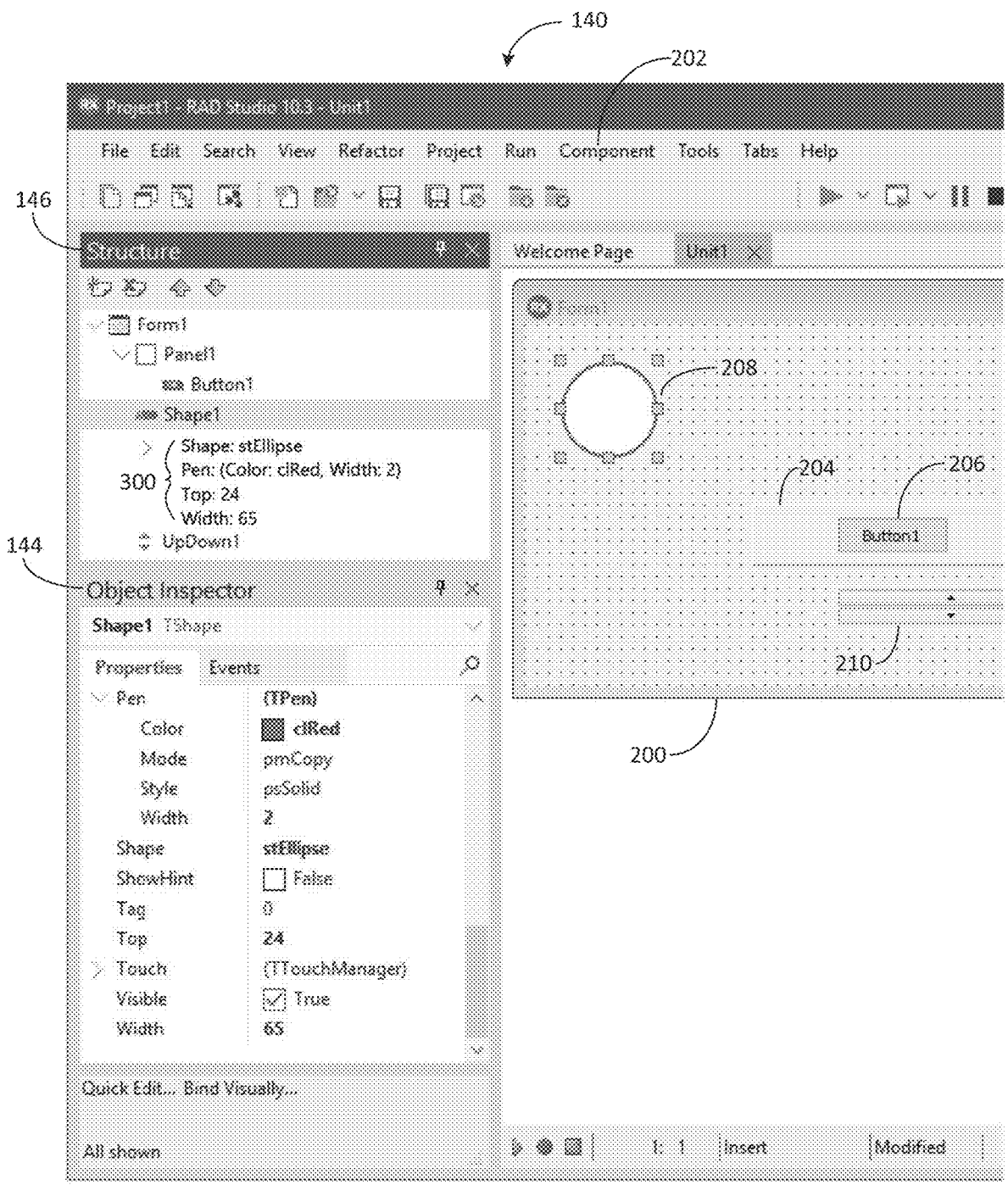
FIG. 3 is a diagram of a partial screen view of a developer interface having a changed properties list, according to some embodiments.

For a non-limiting example, as shown in FIG. 3, the developer interface 140 displays only the changed properties from among all of the properties for a selected graphical shape 208 in the changed properties list 300. In some embodiments, the changed properties list 300 may be displayed in the structure browser 146, since the structure browser 146 is a text-based hierarchal list of all of the graphics, components, and controls. However, the present disclosure is not limited thereto, and in other embodiments, the changed properties list 300 may be displayed at any suitable location within the developer interface 140 (e.g., at a dedicated area, portion, or window), or any other suitable location on one or more display devices (e.g., 114a-n) associated with the computing device 100. Further, while FIGS. 3-6 show a simplistic example where only one object 208 is selected, it should be appreciated that multiple and/or nested objects can be selected together, and only the changed properties from among all of the properties for each of the selected objects may be displayed in a corresponding changed properties list for the selected objects. Accordingly, in some embodiments, unlike the developer interface 240 shown in FIG. 2 requiring the developer to manually select each object and scroll through all of the properties in the object browser 144 for each selected object to identify the changed properties, the developer can quickly identify all of the changed properties (and their sub-properties, nested properties, or the like) from the changed properties list 300.

Figure 4:
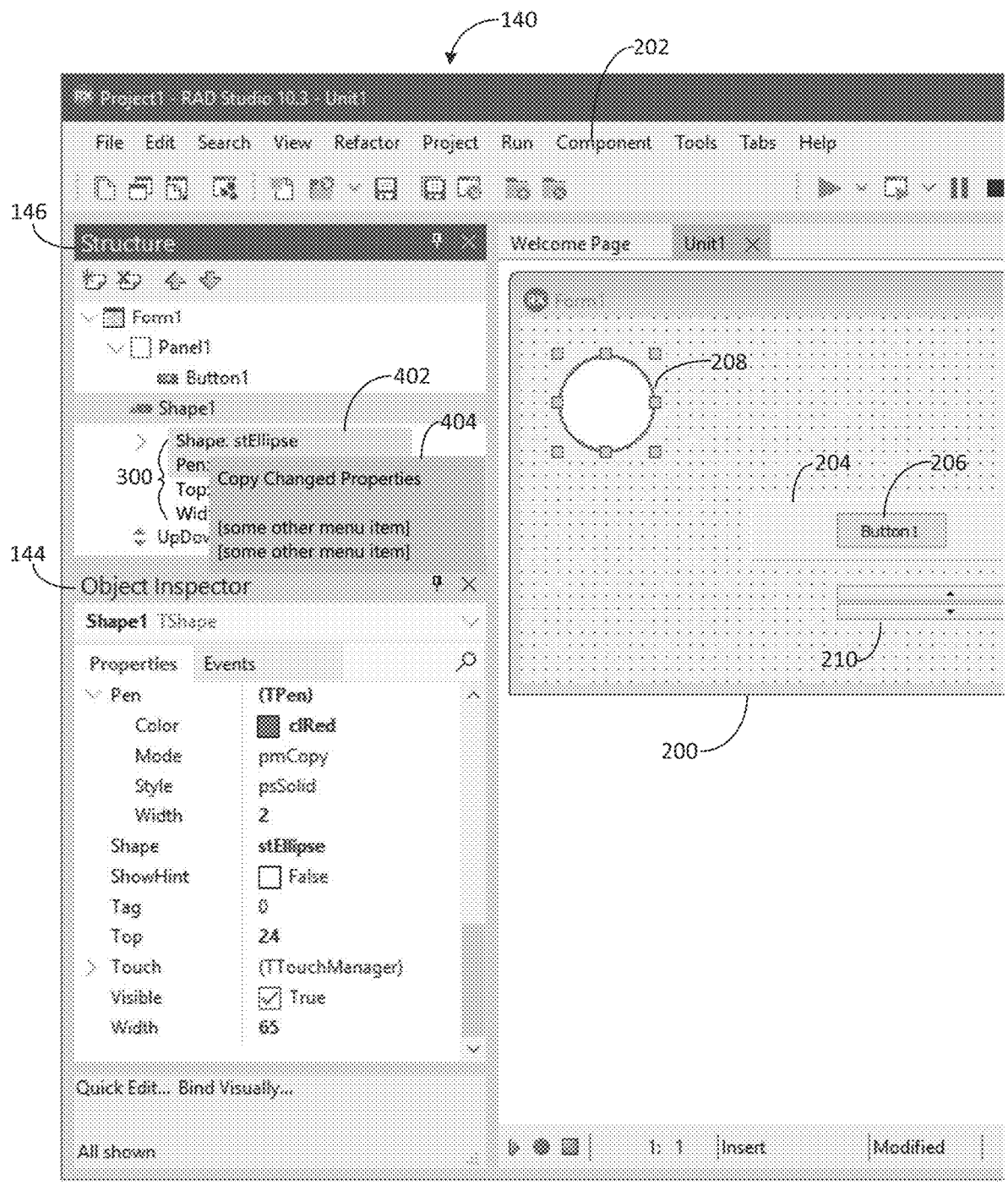
FIG. 4 is a diagram of a partial screen view of a developer interface having a copy function, according to some embodiments.

In some embodiments, the changed properties list 300 enables the developer to quickly copy and apply the changed properties of one or more objects to other one or more objects. For example, in some embodiments, the developer can copy one or more changed properties from the changed properties list 300 to apply the selected properties to another object. Referring more particularly to FIG. 4, in a non-limiting example, the developer can select one or more properties from the changed properties list 300 by highlighting 402 one or more of the desired properties from the changed properties list 300. For example, in some embodiments, the developer can use the pointing device 118 to click or select the desired properties from the changed properties list 300, but the present disclosure is not limited thereto, and in other embodiments, for example, the developer can select the desired properties from the changed properties list 300 using a touchscreen device and a selection tool (e.g., a finger or pen). In other embodiments, the developer may select one or more properties from the object browser 144, and the copy module 154 may identify each of the changed properties to copy only the changed properties from the object browser 144. For example, in some embodiments, as discussed with reference to FIG. 1B, the copy module 154 may compare each of the properties in the object browser 144 with its original or default value to identify the changed properties.

In some embodiments, in response to selecting (e.g., highlighting 402) the desired properties from the changed properties list 300, an overlay image or a popup menu 404 may be presented to the developer to copy the selected properties. In other embodiments, in response to right clicking (e.g., via the pointing device 118 or other suitable device) on the selected (e.g., highlighted 402) properties from the changed properties list 300, the overlay image or popup menu 404 may be presented to the developer. In still other embodiments, in response to selecting (e.g., highlighting 402) the desired properties from the changed properties list 300, the selected (e.g., highlighted 402) properties may be automatically copied instead of presenting the overlay image or popup menu 404. In yet other embodiments, in response to pressing a key or a combination of keys on the keyboard 116, the selected (e.g., highlighted 402) properties may be copied without first displaying the overlay image 404. In some embodiments, as discussed with reference to FIG. 1B, the copy module 154 may temporarily store the selected properties in the data buffer 162 or other suitable memory device (e.g., storage 164) for later retrieval, in response to copying (e.g., automatically or via user command) the selected (e.g., highlighted 402) properties from the changed properties list 300.

Figure 5:
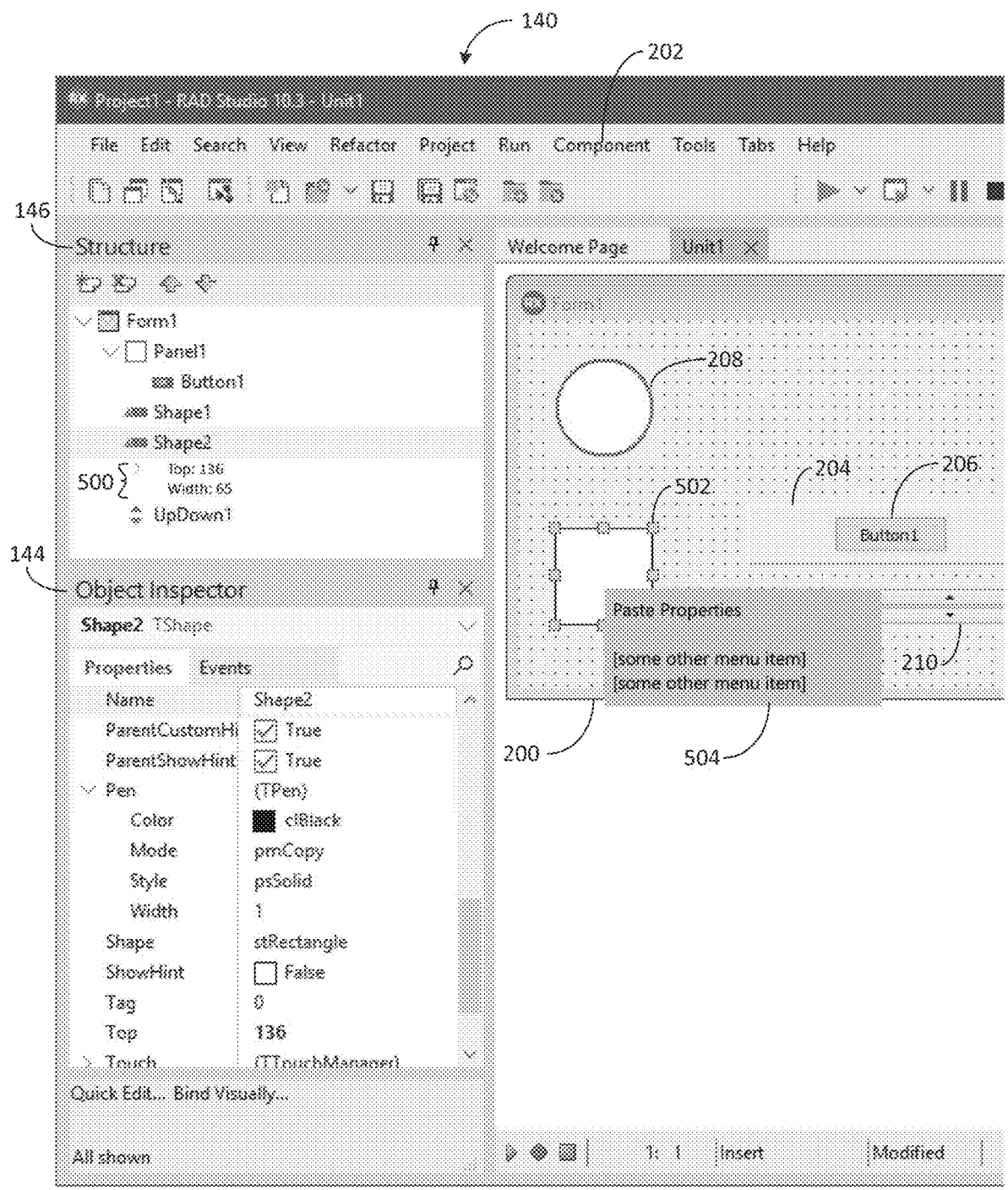
FIG. 5 is a diagram of a partial screen view of a developer interface having an apply function, according to some embodiments.

In some embodiments, the developer may apply (or paste) the copied properties from the changed properties list 300 to one or more other objects, and only those properties of the other object(s) corresponding to the changed properties may be modified. In a non-limiting example, referring more particularly to FIG. 5, the developer may apply the changed properties copied from the changed properties list 300 to another graphical shape 502 (or any other one or more objects). In some embodiments, the other graphical shape 502 may be selected from the component library 202, or imported directly, and arranged in the form window 200 as discussed above. In some embodiments, when the graphical shape 502 is arranged in the form window 200, the property values (e.g., Top, Width, and/or the like) corresponding to the location, size, and/or the like of the graphical shape 502 within the form window 200 may be automatically changed corresponding to a positioning or arrangement of the graphical shape 502 within the form window 200. However, as shown in FIG. 5, the other properties of the graphical shape 502 may have the original or default property values. For example, as shown in the changed property list 500 for the graphical shape 502, only the properties (e.g., Top and Width) corresponding to the location and/or size of the graphical shape 502 arranged within the form window 200 is listed as having changed properties, since the other properties for the graphical shape 502 have their original or default property values (e.g., as shown in the object inspector 144).

In some embodiments, to apply the copied properties of a modified or changed object, the developer may select one or more objects in the form window 200 (or other design area, such as a card, pane, frame, 3-dimensional design area or surface, and/or the like) to which the copied properties are to be applied. For example, as shown in FIG. 5, the graphical shape 502 is selected, and an overlay or popup menu 504 is presented to apply (or paste) the copied properties to the selected graphical shape 502. In some embodiments, in response to selecting the graphical shape 502, the overlay image or a popup menu 504 may be presented to the developer to apply the copied properties. In other embodiments, in response to right clicking (e.g., via the pointing device 118 or other suitable device) on the graphical shape 502, the overlay image or popup menu 504 may be presented. In still other embodiments, in response to selecting the graphical shape 502, the copied properties may be automatically applied instead of presenting the overlay image or popup menu 504. In yet other embodiments, in response to pressing a key or a combination of keys on the keyboard 116, the copied properties may be applied to the one or more selected objects. In some embodiments, as discussed with reference to FIG. 1B, in response to applying the changed properties to the selected one or more objects (e.g., automatically or via user command), the apply module 156 may retrieve the copied properties from the data buffer 162 (or clipboard) or other suitable memory device (e.g., storage 164), compare the copied properties with each of the properties of the selected one or more objects (e.g., based on property type or identifier), and apply the changes to only the properties of the selected one or more objects that correspond to the copied properties.

Figure 6:
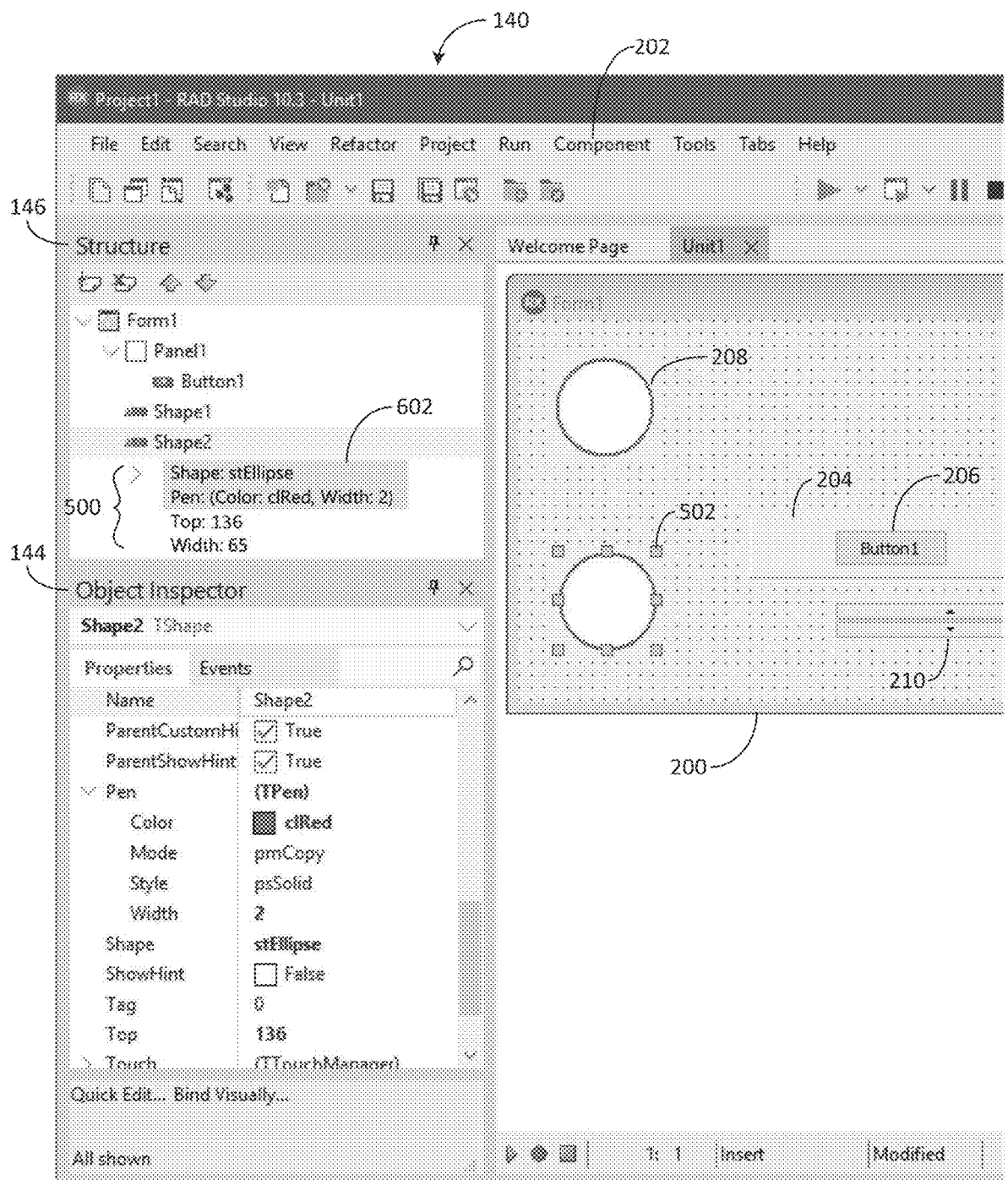
FIG. 6 is a diagram of a partial screen view of a developer interface displaying the results of an apply function, according to some embodiments.

Accordingly, referring more particularly to the non-limiting example of FIG. 6, in response to applying the changed properties to the graphical shape 502, the graphical shape 502 takes on the copied properties from the graphical shape 208. Thus, as shown in FIG. 6, the changed properties list 500 corresponding to the graphical shape 502 now shows additional changed properties 602 corresponding to the changed properties 402 copied from the changed properties list 300 for the graphical shape 208. The other properties of the graphical shape 502 remains with its original or default values, since the copied properties do not correspond to the other properties of the graphical shape 502. Further, the other changed properties that were not selected and copied (e.g., Top and Width) from the graphical shape 208 is not applied to the graphical shape 502, such that the graphical shape 502 still has its Top and Width property values.

While the examples in FIGS. 5 and 6 show only the changed properties 500 for the graphical shape 502 in the structure browser 146, the present disclosure is not limited thereto, and in other embodiments, the changed properties for each of the objects having change properties may be displayed. For example, in some embodiments, the changed properties 300 for the graphical shape 208 may be displayed under the corresponding Shape1 identifier in the structure browser 146, and the changed properties 500 for the graphical shape 502 may be displayed under the corresponding Shape2 identifier in the structure browser 146. In some embodiments, the changed properties lists 300 and 500 may be expanded or compressed (e.g., via a drop-down control) such that the user can hide or show the changed properties lists 300 and 500 in the structure browser 146 as needed or desired. In other embodiments, the changed properties lists 300 and 500 may be displayed at other suitable locations or via an overlay image, for example, when a cursor of the pointing device 118 is scrolled over the object in the form window 200.

While the non-limiting example of FIG. 6 is a simplified example of applying properties from one object (e.g., shape) to another similar object (e.g., another shape) having similar property types or identifiers (e.g., Shape, Pen(Color), and Pen(Width)), the present disclosure is not limited thereto. For example, in some embodiments, when changed properties of one object (e.g., graphical shape) is applied to another object (e.g., button control) having one or more different property types, only those properties corresponding to common property types between the disparate objects are applied. For example, while a button control object may not have a Shape property or a Pen property and sub-properties (e.g., Pen(Color), Pen(Width), and/or the like) like the graphical shape object, the button control object may have other properties having the same or similar property types as some of the copied properties from the graphical shape object, such as a Top property and a Width property. In this case, if the copied properties from the graphical shape object include the Shape property, Pen property, Top property, and Width property, when the copied properties are applied to the button control object, only the Top property and the Width property from the graphical shape object would be applied to the button control object, while the Shape property and the Pen properties are ignored.

Figure 7:
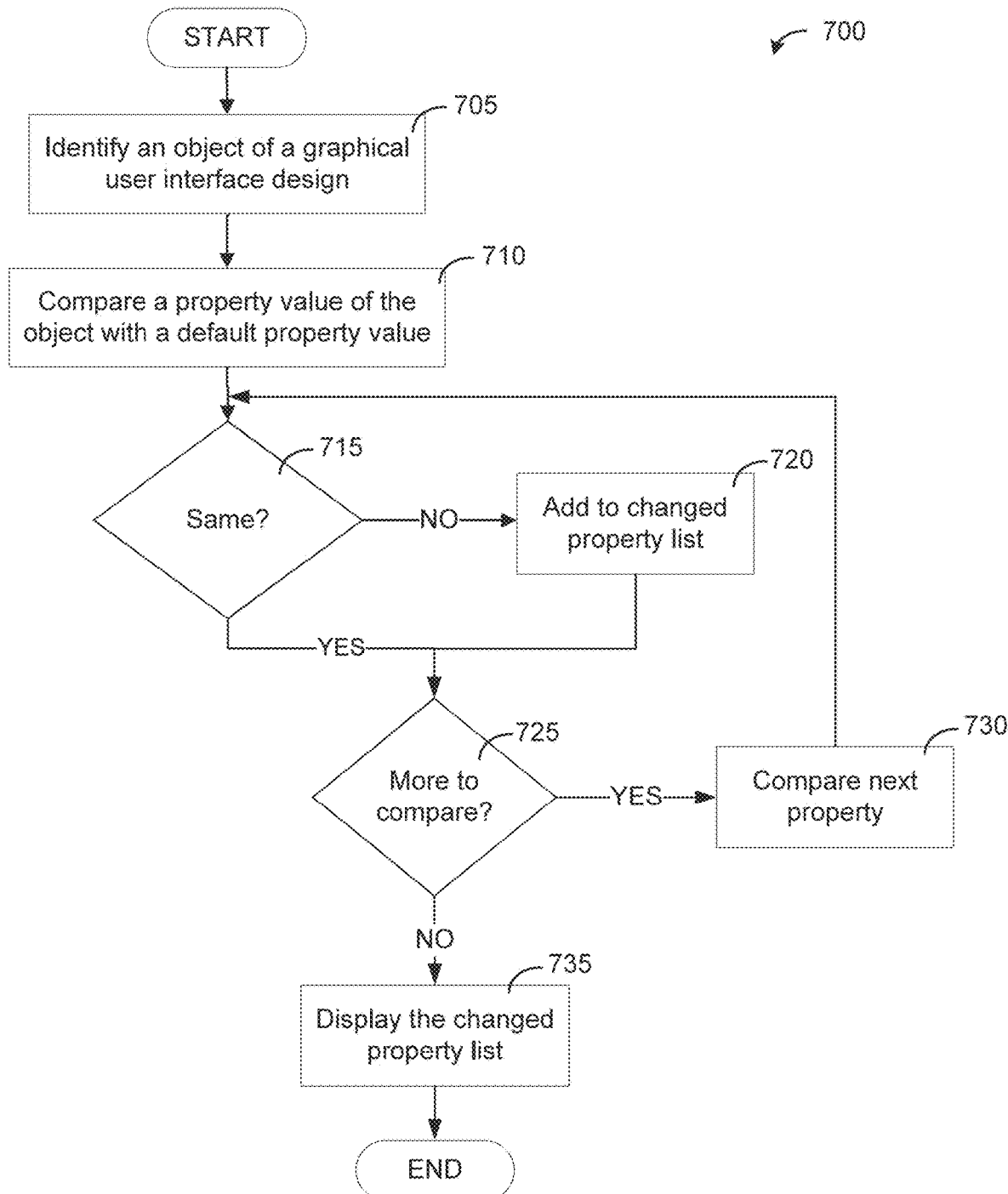
FIG. 7 is a flow diagram of a method for generating a changed property list, according to some embodiments.

FIG. 7 is a flow diagram of a method 700 for generating a changed properties list, according to some embodiments. The functionalities of the method or process 700 may be implemented using, or performed by, the components detailed herein in connection with FIGS. 1-6. In brief overview, the method 700 of FIG. 7 may be used to generate a changed properties list, which is displayed at a suitable location (e.g., the structure browser 146) within the developer interface 140 (or at any suitable location within the display devices 114a-n). For example, the method 700 of FIG. 7 may be used to generate and display the changed properties list 300 and 500 shown in FIGS. 3-6.

In more detail, method 700 starts and at operation 705, an object of a graphical user interface design is identified. In some embodiments, the object may be a predefined, customized, or imported object. In some embodiments, the object may be identified by the change control module 150 in response to the object being added to a form window 200 (e.g., imported directly or from a components library 202) of a developer interface 140. In other embodiments, each of the objects of a GUI design may be identified by the change control module 150 in response to a particular project or GUI design build being executed (or opened) within the developer interface 140. In yet other embodiments, the object of the graphical user interface design may be identified by the change control module 150 in response to the object being selected within the form window 200 of the developer interface 140. In other embodiments, the object of the graphical user interface design may be identified by the change control module 150 in response to user command (e.g., a selection of a control on the developer interface 140 by the user to generate the changed properties list).

At operation 710, a property value of the object is compared with a default property value. For example, in some embodiments, the change tracking module 152 may compare the property value of each of the properties of the object with a corresponding original or default property value, such that the properties of the object having modified or changed property values from their defaults can be added to the changed properties list for the object. In some embodiments, if the property has complex values (e.g., sub-properties, nested properties, or the like), the change tracking module 152 may compare each of the complex values with their default values to identify the values of the property that has been changed. For example, in some embodiments, if the property has sub-properties, the change tracking module 152 may compare each of the values of the sub-properties with their default values to identify the sub-properties of the property that has changed or modified values.

In this case, if the property value (including any complex values such as sub-property values, nested property values, or the like) of the object is determined to be different from the original or default property value (or complex values) at operation 715 (e.g., NO), then the corresponding property (and its changed complex values) is added to the changed property list for the object at operation 720, and the property value for a next property of the object, if any, is compared with its original or default value. On the other hand, if the property value of the object (including each of its complex values) is determined to be the same as the original or default property value at operation 715 (e.g., YES), then the corresponding property is skipped, and the property value for a next property of the object, if any, is compared with its original or default value.

Accordingly, at operation 725, the change tracking module 152 determines if there are more properties of the object that should be compared with their corresponding original or default values. If there are more properties that need comparison, the property value of the next property of the object is compared with its original or default value at block 730, and the method continues at operation 715 to determine if the property value of the next property is the same or different from its original or default value. On the other hand, if the change tracking module 152 determines that there are no more properties of the object needing comparison at operation 725, the changed property list is displayed at operation 735 and the method ends (or continues to evaluate the properties of a next object, if any). For example, in various embodiments, the changed property list may be displayed at any suitable location on the developer interface 140 (e.g., the structure browser 146, overlay image, and/or the like), at any suitable location within the display devices 114a-n, and/or the like.

Figure 8:
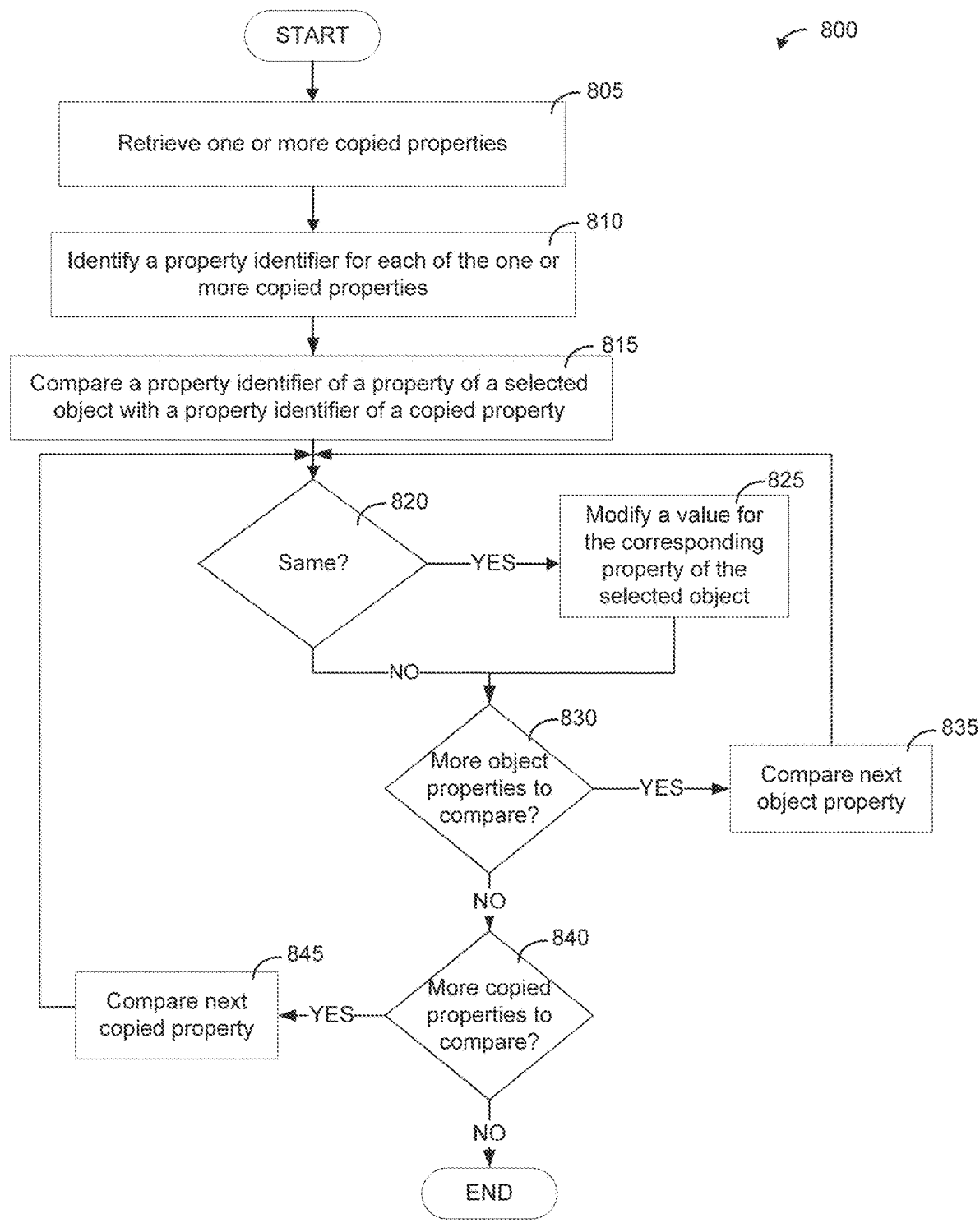
FIG. 8 is a flow diagram of a method for applying copied properties from one object to another object, according to some embodiments.

FIG. 8 is a flow diagram of a method 800 for applying copied properties from one object to another object, according to some embodiments. The functionalities of the process or method 800 may be implemented using, or performed by, the components detailed herein in connection with FIGS. 1-6. In brief overview, the method 800 of FIG. 8 may be used to apply changed properties that are copied from one or more objects to one or more selected objects, such that the properties of the one or more selected objects corresponding to the changed properties are modified or changed, while other properties of the selected one or more objects are left unchanged. For example, the method 800 of FIG. 8 may be used to apply the changed properties copied from the graphical object 208 to corresponding properties of the graphical object 502 shown in FIGS. 3-6.

In more detail, the method 800 starts and at operation 805, one or more copied properties are retrieved. For example, in some embodiments, the copy module 154 may copy the copied properties of one or more objects, or may compare each of the properties with their default values, to identify and temporarily store (e.g., in the data buffer 162) the changed properties, as discussed above with reference to FIG. 1B. Thus, in some embodiments, the apply module 156 may retrieve the copied properties that are temporarily stored in the data buffer 162 (or other storage device, such as storage 164, for example). In other embodiments, the apply module 156 may retrieve (e.g., receive or request) the one or more copied properties from the copy module 154.

At operation 810, a property type or identifier (e.g., property name) for each of the one or more copied properties is identified. For example, in some embodiments, the apply module 156 may identify the property identifier of each of the copied properties, such that the copied values of the copied properties can be applied to corresponding properties of one or more selected objects having the same or similar property identifiers. For example, if a shape property is copied from an object, the property value of the shape property should only be applied to other objects that have a shape property. Accordingly, at operation 815, a property identifier of a property of the selected object is compared with a property identifier of a copied property, such that only the properties of the selected object having the same or similar property identifiers as those of the copied properties are modified or changed.

In this case, in some embodiments, if the property identifier of the property of the selected object matches the property identifier of the copied property at operation 820 (e.g., YES), the apply module 156 may modify the property value of the corresponding property of the selected object based on the property value of the corresponding copied property at operation 825, and the property identifier for a next property of the object, if any, is compared. On the other hand, if the property identifier of the property of the selected object does not match the property identifier of the copied property at operation 820 (e.g., NO), then the apply module 156 determines if there are more properties of the selected object to compare at operation 830.

In some embodiments, if the property value of the copied property is a complex value (e.g., having sub-properties, nested properties, or the like), a property type or identifier (e.g., a name) of each of the sub-properties, nested properties, or the like of the copied property are identified and compared with a property type or identifier of each sub-property, nested property, or the like of the matching property identified at operation 820. In this case, in some embodiments, only the values of the sub-properties, nested-properties, and the like of the matching property identified at operation 820 that match the property identifiers of the copied sub-properties, nested properties, or the like are modified according to the copied values at operation 825. In other embodiments, if the matching property identified in operation 820 does not include a corresponding sub-property, nested property, or the like matching those of the copied property, then none of the copied values may be applied. In still other embodiments, if the matching property identified in operation 820 does not include a corresponding sub-property, nested property, or the like matching those of the copied property, then the corresponding sub-property, nested property, or the like may be added to the matching property identified at operation 820.

If there are more properties of the selected object to compare with the corresponding copied property at operation 830 (e.g., YES), then a next property of the selected object is compared with the corresponding copied property at operation 835, and the method continues to operation 820 to compare the property identifier of the next property with the property identifier of the corresponding copied property. On the other hand, if there are no more properties of the selected object to compare with the corresponding copied property at operation 830 (e.g., NO), then the apply module 156 determines if there are more copied properties to compare at operation 840. If there are more copied properties to compare at operation 840 (e.g., YES), then a next copied property is compared at operation 845, and the method continues to operation 820 to compare the property identifier of the next copied property with the property identifier of each of the properties of the selected object. If there are no more copied properties to compare at operation 840 (e.g., NO), then the process ends (or continues to evaluate the properties of a next selected object). Accordingly, in some embodiments, when copied properties are applied to one or more selected objects, each of the properties of the selected objects are compared with each of the copied properties to determine those properties of the selected objects to change or modify, and those to leave alone.

What is claimed is:

1. A user interface design platform comprising:
one or more processors; and
memory coupled to the one or more processors and storing instructions that, when executed by the one or more processors, cause the one or more processors to:
identify a first object in a graphical user interface (GUI) design, the first object including a plurality of first properties that define the first object within the GUI design;
determine one or more modified properties of the plurality of first properties, the one or more modified properties each having a property value that is different from a corresponding default property value;
generate a changed properties list for the first object, the changed properties list including the one or more modified properties of the plurality of first properties, and omitting other properties of the plurality of first properties, the other properties having their corresponding default property values; and
display the changed properties list on a display device associated with a user of the user interface design platform.

2. The user interface design platform of claim 1, wherein to determine the one or more modified properties of the plurality of first properties, the instructions further cause the one or more processors to:
compare a property value of a first property of the plurality of first properties with a corresponding default property value for the first property;
determine that the property value of the first property does not match the default property value for the first property; and
add the first property and the property value of the first property to the changed properties list.

3. The user interface design platform of claim 2, wherein the instructions further cause the one or more processors to:
compare a property value of a second property of the plurality of first properties with a corresponding default property value for the second property;
determine that the property value of the second property matches the default property value for the second property; and
omit the second property from the changed properties list as one of the other properties.

4. The user interface design platform of claim 3, wherein the changed properties list is displayed with an identifier of the first object in a browser window on the display device such that the modified properties from among the plurality of first properties are displayed in the browser window while the other properties from among the plurality of first properties are not displayed in the browser window.

5. The user interface design platform of claim 1, wherein the instructions further cause the one or more processors to:
copy at least one of the one or more modified properties of the plurality of first properties;
receive a selection of a second object within the GUI design, the second object having a plurality of second properties that define the second object; and
apply the at least one copied property to at least one of the second properties by changing a property value of the at least one second property corresponding to the property value of the at least one copied property.

6. The user interface design platform of claim 5, wherein the at least one of the one or more modified properties are copied from the changed properties list.

7. The user interface design platform of claim 5, wherein the at least one of the one or more modified properties are copied in response to a property value of the at least one of the one or more modified properties being different from a corresponding default value.

8. The user interface design platform of claim 5, wherein to apply the at least one copied property to at least one of the second properties, the instructions further cause the one or more processors to:
identify a property type of the at least one copied property; and
compare the property type for the at least one copied property with a property type for each of the second properties.

9. The user interface design platform of claim 8, wherein to apply the at least one copied property to at least one of the second properties, the instructions further cause the one or more processors to:
identify a property type for at least one of the second properties that matches the property type of the at least one copied property; and
modify a property value for the at least one of the second properties matching the property type of the at least one copied property according to the property value of the at least one copied property.

10. The user interface design platform of claim 9, wherein the second properties having property types that do not match the property type of the at least one copied property are left unmodified.

11. The user interface design platform of claim 1, wherein the first object or one or more of the plurality of properties correspond to non-visual function, behavior or capabilities of the GUI design.

12. A method of designing a graphical user interface (GUI) utilizing a user interface design platform, the method comprising:
identifying, by one or more processors of the user interface design platform, a first object in a GUI design, the first object including a plurality of first properties that define the first object within the GUI design;
determining, by the one or more processors, one or more modified properties of the plurality of first properties, the one or more modified properties each having a property value that is different from a corresponding default property value;
generating, by the one or more processors, a changed properties list for the first object, the changed properties list including the one or more modified properties of the plurality of first properties, and omitting other properties of the plurality of first properties, the other properties having their corresponding default property values; and displaying, by the one or more processors, the changed properties list on a display device associated with a user of the user interface design platform.

13. The method of claim 12, wherein to determine the one or more modified properties of the plurality of first properties, the method further comprises:
comparing, by the one or more processors, a property value of a first property of the plurality of first properties with a corresponding default property value for the first property;
determining, by the one or more processors, that the property value of the first property does not match the default property value for the first property; and
adding, by the one or more processors, the first property and the property value of the first property to the changed properties list.

14. The method of claim 13, further comprising:
comparing, by the one or more processors, a property value of a second property of the plurality of first properties with a corresponding default property value for the second property;
determining, by the one or more processors, that the property value of the second property matches the default property value for the second property; and
omitting, by the one or more processors, the second property from the changed properties list as one of the other properties.

15. The method of claim 14, wherein the changed properties list is displayed with an identifier of the first object in a browser window on the display device such that the modified properties from among the plurality of first properties are displayed in the browser window while the other properties from among the plurality of first properties are not displayed in the browser window.

16. The method of claim 12, further comprising:
copying, by the one or more processors, at least one of the one or more modified properties of the plurality of first properties;
receiving, by the one or more processors, a selection of a second object within the GUI design, the second object having a plurality of second properties that define the second object; and
applying, by the one or more processors, the at least one copied property to at least one of the second properties by changing a property value of the at least one second property corresponding to the property value of the at least one copied property.

17. The method of claim 16, wherein the at least one of the one or more modified properties are copied from the changed properties list.

18. The method of claim 16, wherein the at least one of the one or more modified properties are copied in response to a property value of the at least one of the one or more modified properties being different from a corresponding default value.

19. The method of claim 16, wherein to apply the at least one copied property to at least one of the second properties, the method further includes:
identifying, by the one or more processors, a property type of the at least one copied property; and
comparing, by the one or more processors, the property type for the at least one copied property with a property type for each of the second properties.

20. The method of claim 19, wherein to apply the at least one copied property to at least one of the second properties, the method further includes:
identifying, by the one or more processors, a property type for at least one of the second properties that matches the property type of the at least one copied property; and
modifying, by the one or more processors, a property value for the at least one of the second properties matching the property type of the at least one copied property according to the property value of the at least one copied property.

21. The method of claim 20, wherein the second properties having property types that do not match the property type of the at least one copied property are left unmodified.

22. The user interface design platform of claim 1, wherein the first object or one or more of the plurality of properties correspond to non-visual function, behavior or capabilities of the GUI design.

23. One or more non-transitory computer readable media containing program instructions that, when executed by one or more processors, cause the one or more processors to perform operations comprising:
identifying a first object in a GUI design, the first object including a plurality of first properties that define the first object within the GUI design;
determining one or more modified properties of the plurality of first properties, the one or more modified properties each having a property value that is different from a corresponding default property value;
generating a changed properties list for the first object, the changed properties list including the one or more modified properties of the plurality of first properties, and omitting other properties of the plurality of first properties, the other properties having their corresponding default property values; and
displaying the changed properties list on a display device associated with a user of the user interface design platform.

* * * * *